(12) United States Patent
Yanase et al.

(10) Patent No.: US 6,548,188 B1
(45) Date of Patent: Apr. 15, 2003

(54) RESIN COMPOSITION FOR SLIDING MEMBER, AND SLIDING MEMBER PRODUCED THEREFROM

(75) Inventors: Sumihide Yanase, Kanagawa-ken (JP); Takashi Nakamaru, Kanagawa-ken (JP)

(73) Assignee: Oiles Corporation, Tokyo (JP)

( * ) Notice: Subject to any disclaimer, the term of this patent is extended or adjusted under 35 U.S.C. 154(b) by 163 days.

(21) Appl. No.: 09/597,912

(22) Filed: Jun. 19, 2000

(30) Foreign Application Priority Data

Mar. 8, 2000 (JP) ........................... 2000-063838

(51) Int. Cl.$^7$ ............... B32B 15/08; B32B 5/00; F16C 33/20
(52) U.S. Cl. ................ 428/626; 428/306.6; 428/458; 428/421; 428/469; 442/19; 384/300
(58) Field of Search ................ 428/626, 624, 428/615, 632, 681, 245, 246, 247, 256, 304.4, 306.6, 457, 458, 421, 469, 471, 472, 473.5; 384/276, 300, 908

(56) References Cited

U.S. PATENT DOCUMENTS

| | | | | | |
|---|---|---|---|---|---|
| 5,300,366 A | * | 4/1994 | Nakamaru et al. | ......... | 428/549 |
| 5,447,774 A | * | 9/1995 | Tanaka et al. | .............. | 428/141 |
| 5,616,406 A | * | 4/1997 | Nakamaru et al. | ............ | 442/19 |
| 5,726,232 A | * | 3/1998 | Egami et al. | ............... | 524/414 |
| 5,732,322 A | * | 3/1998 | Nakamaru et al. | ......... | 428/550 |

\* cited by examiner

Primary Examiner—Deborah Jones
Assistant Examiner—Michael LaVilla
(74) Attorney, Agent, or Firm—Nixon & Vanderhye P.C.

(57) ABSTRACT

A resin composition for a sliding member of the present invention comprises 5 to 40% by weight of barium sulfate; 1 to 30% by weight of a phosphate; 1 to 10% by weight of at least one selected from the group consisting of a polyimide resin, a phenol resin-calcined product and a polyphenylene sulfone resin; and the balance of a polytetrafluoroethylene resin, and a sliding member produced from the resin composition.

Such a resin composition suitable for producing a sliding member capable of exhibiting a stable low friction coefficient and an extremely low wear amount under dry frictional condition, or under oil-immersed or oil-lubricated condition.

5 Claims, 1 Drawing Sheet

RESIN COMPOSITION FOR SLIDING MEMBER, AND SLIDING MEMBER PRODUCED THEREFROM

BACKGROUND OF THE INVENTION

The present invention relates to a resin composition for a sliding member, and a sliding member produced from the resin composition, and more particularly, to a resin composition suitable for producing a sliding member capable of exhibiting a stable low friction coefficient and an extremely low wear amount under dry frictional condition, or under oil-immersed or oil-lubricated condition, and a sliding member capable of exhibiting a stable low friction coefficient and an extremely low wear amount under dry frictional condition, or under oil-immersed or oil-lubricated condition, which is produced from such a resin composition.

Hitherto, since polytetrafluoroethylene resins (hereinafter simply referred to as "PTFE resin") have not only excellent self-lubricating properties and low friction coefficient, but also chemical resistance and heat resistance, these resins have been used generally for sliding members such as bearings.

However, since the sliding member made of the PTFE resin solely is poor in the wear resistance and load carrying capacity, such a drawback is compensated, for example, by (a) incorporating a solid lubricant such as graphite and molybdenum disulfide, and/or a reinforcing material such as glass fibers and carbon fibers into the PTFE resin, (b) filling the PTFE resin in the pores of a porous sintered metal layer lined by a steel backing plate and coating the surface of the sintered metal layer therewith, or (c) filling the PTFE resin in the meshes of a metal mesh and coating the surface of the metal mesh therewith, depending on the applications of the sliding member.

The sliding members formed by the method (b) have been known as a so-called multi-layered sliding member, and described, for example, in U.S. Pat. No. 2,689,380 (1954) and Japanese Patent Publications (KOKOKU) No. 31-2452 (1956), No. 39-16950(1964) and No. 41-1868(1966). The multi-layered sliding members described in these publications have been produced by filling the PTFE resin or the PTFE resin containing a filler composed of lead or a lead oxide in the pores of a porous sintered metal layer lined by a steel backing plate, and coating the surface of the sintered metal layer therewith.

The sliding members formed by the method (c) are described, for example, in Japanese Patent Publication (KOKOKU) No. 55-23740(1980). In the publication, there is disclosed as a sliding member a self-lubricating lining foil comprising a metal wire fabric, a fluoro-plastic and a reinforcing material of inorganic fiber.

In the sliding members described above, fillers have been selectively used according to various different working conditions, for example, under dry frictional condition, oil-immersed condition or oil-lubricated condition, but these sliding members fail to fully satisfy requirements under all of the working conditions.

Further, in a PTFE resin composition for sliding member, it has been attempted to use therein fillers for engineering plastics, for example, graphite, molybdenum disulfide or other metal sulfides, metal oxides, or inorganic fibers such as glass fibers and carbon fibers. Although these fillers contribute to the improvement of the wear resistance of the resin layer, the fillers tend to cause such a problem that the use thereof adversely affects the low-friction property inherent to the PTFE resin. In particular, lead have been widely used as a filler in these resins to improve the wear resistance of a sliding layer. However, for secondary reasons such as recent environmental pollution and public nuisance, the use of lead must be avoided.

As a result of the present inventors' earnest studies, it has been found that by filling in the pores of a porous sintered metal layer formed on a steel backing plate and coating the surface of the sintered metal layer with a resin composition prepared by blending PTFE with a specific amount of barium sulfate, a phosphate, a polyimide resin, a phenol resin-calcined product or a polyphenylenesulfone resin, or by filling in the meshes of a metal mesh and coating the surface of the metal mesh with a resin composition prepared by blending PTFE with a specific amount of barium sulfate, a phosphate, a polyimide resin, a phenol resin-calcined product or a polyphenylene sulfon resin, the obtained sliding member can exhibit excellent friction and wear characteristics under dry frictional condition, or under oil-immersed or oil-lubricated condition. The present invention has been attained based on this finding.

SUMMARY OF THE INVENTION

An object of the present invention is to provide a resin composition for a sliding member capable of exhibiting excellent friction and wear characteristics under various different working conditions, i.e., under dry frictional condition, oil-immersed condition or oil-lubricated condition.

An another object of the present invention is to provide a sliding member capable of exhibiting excellent friction and wear characteristics under various different working conditions, i.e., under dry frictional condition, oil-immersed condition or oil-lubricated condition, which are produced using the resin composition.

To accomplish the aims, in a first aspect of the present invention, there is provided a resin composition for a sliding member comprising 5 to 40% by weight of barium sulfate; 1 to 30% by weight of a phosphate; 1 to 10% by weight of at least one selected from the group consisting of a polyimide resin, a phenol resin-calcined product and a polyphenylene sulfone resin; and the balance of a polytetrafluoroethylene resin. In a second aspect of the present invention, there is provided a sliding member comprising:

a substrate comprising a steel backing plate and a porous sintered metal layer formed on said steel backing plate, or comprising a metal mesh; and a resin composition applied to pores or meshes and a surface of said substrate, comprising 5 to 40% by weight of barium sulfate, 1 to 30% by weight of a phosphate, 1 to 10% by weight of at least one selected from the group consisting of a polyimide resin, a phenol resin-calcined product and a polyphenylene sulfone resin and the balance of a polytetrafluoroethylene resin.

DETAILED DESCRIPTION OF THE INVENTION

Figure 1:
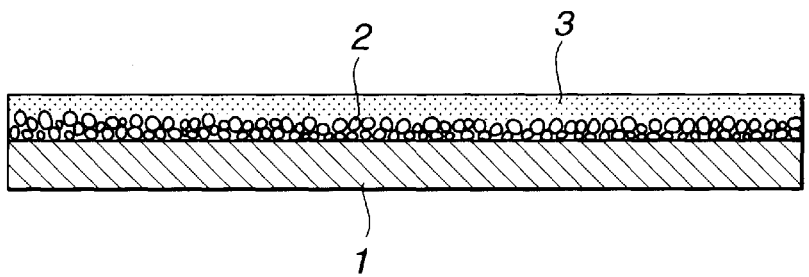
FIG. 1 is a cross-sectional view illustrating an example of a sliding member according to the present invention.

The present invention will be described in detail below.

First, the resin composition for a sliding member according to the present invention is explained.

As the PTFE resin as a main component of the resin composition according to the present invention, there can be used fine powder, for example, commercially available products such as "Teflon 6CJ" (tradename, produced by Mitsui duPont Fluorochemical Co., Ltd), "Polyflon F201" (tradename, produced by Daikin Kogyo Co., Ltd), and "Fluon CD-076" and "Fluon CD-1" (tradenames, both produced by Asahi Glass Co., Ltd).

There may be used a PTFE resin composition comprising the above fine powder and a molding powder, for example, "Teflon 7AJ" (tradename, produced by Mitsui duPont Fluorochemical Co., Ltd.) which is blended therewith in an amount of not more than 20% by weight based on the resin composition.

The content of the PTFE resin in the resin composition is the balance (remainder) which is calculated by subtracting an amount of the filler such as barium sulfate, phosphate, polyimide resin, phenol resin-calcined product, polyphenylene sulfone resin, graphite and molybdenum disulfide from the total amount of the resin composition. The content of the PTFE resin is preferably 50 to 93% by weight.

When the barium sulfate ($BaSO_4$) is incorporated as a filler in the PTFE resin, the obtained resin composition is free from drawbacks of the conventional sliding member made of the PTFE resin singly, such as deteriorated wear resistance and load carrying capacity, and can be considerably enhanced in the wear resistance and load carrying capacity. The effects by the addition of barium sulfate are more remarkably exhibited especially under low-load working conditions of the sliding member.

As the barium sulfate ($BaSO_4$), there may be used either precipitated-type barium sulfate or baryte-type barium sulfate. Such barium sulfate is easily available, for example, from Sakai Chemical Industry Co., Ltd. The average particle size of barium sulfate is usually not more than 10 $\mu$m, preferably from 1 to 5 $\mu$m. The amount of the barium sulfate blended is usually from 5 to 40% by weight, preferably 10 to 30% by weight, more preferably 15 to 25% by weight based on the weight of the resin composition.

When the amount of the barium sulfate blended is less than 5% by weight, it is difficult to achieve the above effects of improving an wear resistance and a load carrying capacity of the resin composition. On the contrary, when the amount of the barium sulfate blended is more than 40% by weight, there is a tendency to lower a mechanical strength and a load carrying capacity.

The phosphate as the filler for the resin composition according to the present invention does not exhibit a lubricating property, unlike solid lubricants such as graphite and molybdenum disulfide. However, when the phosphate is blended with the PTFE resin, the phosphate exhibits an effect of promoting a lubricating film-forming property of the PTFE resin to the surface of a mating member (sliding surface), thereby enhancing sliding characteristics of the sliding member such as low-friction property and wear resistance.

As the phosphate used in the present invention, there may be exemplified metal salts such as metal secondary phosphate, metal tertiary phosphate, metal pyrophosphate, metal phosphite, metal metaphosphate and a mixture thereof. Among these phosphates, metal secondary phosphate, metal tertiary phosphate, metal pyrophosphate are preferred. As the salt-forming metal, alkali metals and alkali earth metals are preferred, and lithium (Li) and calcium (Ca) are more preferred.

Specific examples of the phosphates may include trilithium phosphate ($Li_3PO_4$), lithium hydrogen phosphate ($Li_2HPO_3$), lithium pyrophosphate ($Li_4P_2O_7$), tricalcium phosphate ($Ca_3(PO_4)_2$), calcium pyrophosphate ($Ca_2P_2O_7$), calcium hydrogen phosphate ($CaHPO_4$) and the like. Among these phosphates, calcium pyrophosphate ($Ca_2P_2O_7$) is preferred.

Even when only a small amount, for example, 1% by weight of the phosphate based on the weight of the resin composition is blended in the PTFE resin, the above effect of promoting the formation of lubricating film can be observed, and maintained until the amount of the phosphate blended reaches 30% by weight. However, when the amount of the phosphate blended exceeds 30% by weight based on the weight of the resin composition, a too large amount of lubricating film may be formed on the surface of the mating member, thereby rather causing deterioration in wear resistance of the sliding member. Therefore, the amount of the phosphate blended is usually 1 to 30% by weight, preferably 5 to 25% by weight, more preferably 10 to 20% by weight based on the weight of the resin composition. When the amount of the phosphate blended is less than 1% by weight, it is difficult to obtain the effect of promoting the formation of lubricating film.

When the polyimide resin, phenol resin-calcined product or polyphenylene sulfone resin are blended as a filler in the resin composition according to the present invention, these fillers contribute to enhancement of wear resistance and heat resistance of the sliding member obtained therefrom. The effect of enhancing the wear resistance is more remarkably exhibited when the sliding member is used under high-load working condition. These fillers compensates the drawback observed when the sliding member containing the barium sulfate solely as a filler is used under the high load working condition. Thus, when the above polyimide resin, phenol resin-calcined product or polyphenylene sulfone resin is blended together with barium sulfate in the resin composition, the obtained sliding member can be used under more extensive working conditions.

As the polyimide resins, there may be used aromatic polyimide resins such as "P84 Polyimide" (tradename, produced by Lenzing AG.) and thermosetting polyimide resins such as "Bismaleimide" (tradename, produced by Ciba Geigy AG.), "Techmight" (tradename, produced by Mitsui Kagaku Co., Ltd.) and "Carbodiimide" (tradename, produced by Nisshin Boseki Co., Ltd.).

As the phenol resin-calcined products, there may be exemplified products obtained by carbonizing (calcining) phenol/formaldehyde resin particles at a high temperature of from 400 to 2,200° C. in an inert atmosphere, for example, "Bellpearl C-800" and "Bellpearl C-2000" (tradenames, both produced by Kanebo Co., Ltd.).

As the polyphenylene sulfone resins, there may be exemplified polymers composed mainly of a repeating unit represented by the following general formula (I). Further, it is preferred that in the repeating unit (I), a structural unit represented by the following formula (II) is contained in an amount of not less than 60%.

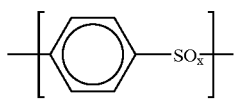

wherein X is 0, 1 or 2.

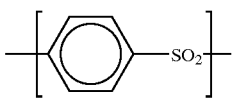

Specific examples of the polyphenylene sulfone resins may include "Ceramer" (tradename, produced by Hoechst AG.) and the like.

The polyimide resins, phenol resin-calcined products and polyphenylene sulfone resins may be used singly or in the form of a mixture of any two or more thereof. The amount of polyimide resin, calcined product of phenol resin or polyphenylene sulfone resin blended is usually 1 to 10% by weight, preferably 1 to 7% by weight, more preferably 2 to 5% by weight based on the weight of the resin composition.

When the amount of the polyimide resins, phenol resin-calcined products or polyphenylene sulfone resin blended is less than 1% by weight, it is difficult to achieve the above effects of improving wear resistance and heat resistance of the resin composition.

For the purpose of further enhancing the wear resistance, the resin composition of the present invention may further contains, in addition to the above components, a solid lubricant selected from graphite and molybdenum disulfide in an amount of usually not more than 5% by weight, preferably 0.5 to 3% by weight, more preferably 0.5 to 2% by weight based on the weight of the resin composition.

Next, the sliding member according to the present invention and the process for producing the sliding member will be explained.

First, the multi-layered sliding member (I) using a substrate comprising a backing plate made of thin steel plate and a porous sintered metal layer lined by the backing plate, and the process for the production of such a multi-layered sliding member are explained.

As the backing plate of the substrate, there may be used a general structural rolled steel plate. As the steel plate, a continuous steel strip provided in the form of a coiled hoop material is preferred, though not limited thereto. However, other steel strip materials cut into an appropriate length may also be used in the present invention. These steel strips may be copper-plated or tin-plated, if required, in order to improve the corrosion resistance thereof.

As the metal powder for forming the porous sintered metal layer, there may be suitably used copper alloys capable of passing through about 100 mesh sieve, such as bronze, lead bronze and phosphor bronze, which are inherently excellent in friction and wear characteristics. However, other metal powders, for example, those of aluminum alloys or iron may be used depending upon aimed applications. The metal powder may have any particle shape such as massive shape, spherical shape or other irregular shapes. There are required that the metal powder particles of the porous sintered metal layer are strongly bonded to each other and the sintered metal layer is strongly bonded to the steel strip backing plate, and that the sintered metal layer has predetermined thickness and porosity. The thickness of the porous sintered metal layer is usually 0.15 to 0.40 mm, preferably 0.2 to 0.3 mm. The porosity of the porous sintered metal layer is usually not less than 10% by volume, preferably 15 to 40% by volume.

A resin composition having a wettability can be obtained by mixing a PTFE resin powder with the above fillers and then admixing under stirring a petroleum-based solvent into the resultant mixture. The PTFE resin and the fillers are mixed at a temperature not more than the room-temperature transition point (19° C.) of the PTFE resin, preferably from 10 to 18° C. Further, the resultant mixture and the petroleum-based solvent are also mixed under stirring at the same temperature as described above. By such a temperature condition, fibrillation of the PTFE resin can be inhibited, thereby obtaining a homogeneous mixture.

As the petroleum-based solvent, there may be used naphtha, toluene, xylene, an aliphatic solvent or a mixed solvent of an aliphatic solvent and a naphthenic solvent. The amount of the petroleum-based solvent used is from 15 to 30 parts by weight based on 100 parts by weight of a mixture of the PTFE resin powder and the fillers. When the amount of the petroleum-based solvent used is less than 15 parts by weight, the extensibility of the resin composition having a wettability is poor in the filling and covering step of the porous sintered metal layer as described later with the resin composition, so that uneven filling and covering of the porous sintered metal layer with the resin composition tends to occur. On the other hand, when the amount of the petroleum-based solvent used exceeds 30 parts by weight, the filling and covering operation becomes difficult, and the uniformity of the thickness of the resin composition applied and the adhesion between the resin composition and the porous sintered metal layer are deteriorated.

The sliding member (I) according to the present invention is produced by the following steps (a)–(d).

(a) A resin composition having a wettability is spread over a porous sintered metal layer formed on a thin steel backing plate, and rolled to fill the resin composition into pores of the porous sintered metal layer and simultaneously coat the surface of the porous sintered metal layer to form a coating layer of the resin composition having a uniform thickness thereon. In this step, the thickness of the coating layer is from 2 to 2.5 times the thickness of the resin layer required for final products. The filling of the resin composition into pores of the porous sintered metal layer is substantially accomplished during this step.

(b) The backing plate thus treated in the step (a) is held in a drying furnace heated to a temperature of from 200 to 250° C. for several minutes to remove the petroleum-based solvent. Then, the dried resin composition is rolled under a pressure of 300 to 600 kgf/cm$^2$ to obtain the predetermined thickness of the coating layer.

(c) The backing plate thus treated in the step (b) is introduced into a heating furnace, and heated at a temperature of from 360 to 380° C. for a period between several minutes and ten and several minutes to sinter the resin composition. Then, the backing plate is taken out of the furnace and rolled again to correct the size.

(d) The backing plate subjected to the correction in the step (c) is cooled (air-cooled or naturally-cooled), and then subjected to correction of waviness or the like of the backing plate, if required, thereby obtaining an aimed sliding member.

The sliding member thus obtained by the steps (a) through (d), comprises the porous sintered metal layer having a thickness of 0.10 to 0.40 mm, and the coating layer composed of the resin composition having a thickness of 0.02 to 0.15 mm. The thus obtained sliding member is cut into an appropriate size, and used as a flat sliding plate, or as a cylindrical winding bush by bending.

Next, the sliding member (II) of the present invention using a metal mesh as a substrate and the process for producing such a sliding member are explained.

As the metal mesh as a substrate, there may be used (i) an expanded metal produced by inserting a thin metal plate between a stationary lower die equipped with a linear blade and a movable upper die equipped with a wave-shaped, trapezoid or triangular blade, in a direction perpendicular or inclined to the linear blade of the stationary lower die, and vertically reciprocating the movable upper die to notch the thin metal plate and simultaneously spread the notched plate, thereby forming meshes regularly arranged in rows on the plate, (ii) a woven wire mesh formed by weaving fine metal wires as warp and weft, and (iii) a knitted wire mesh formed by knitting fine metal wires.

As the preferable expanded metal, there may be used those produced by processing a thin metal plate having a thickness of 0.3 to 2 mm into an expanded metal form having a side (strand) length of 0.1 to 1.5 mm and a thickness of 0.1 to 1.0 mm. As the preferable woven or knitted wire mesh, there may be used those produced by weaving or knitting fine metal wires having a diameter of 0.1 to 0.5 mm into a net having 10 to 100 meshes.

As the metal materials constituting the expanded metal or woven or knitted wire mesh, there may be suitably used thin metal plates or fine wires made of stainless steel, copper, phosphor bronze, bronze, iron or the like.

The sliding member (II) according to the present invention can be produced through the following steps (a') to (c'). In the production of the sliding member (II), the same resin composition as described above for the production of the sliding member (I) is used.

(a') The resin composition is spread over the expanded metal or the woven or knitted wire mesh, and rolled to fill the meshes of the metal mesh with the resin composition and simultaneously coat the surface of the metal mesh, thereby forming a coating layer having a uniform thickness thereon. In this step, the thickness of the thus formed coating layer is from 2 to 2.5 times the thickness of the resin layer required for final products.

(b') The metal mesh treated in the step (a') is held in a drying furnace heated to a temperature of 200 to 250° C. for several minutes to remove the petroleum-based solvent. Then, the dried resin composition is rolled under a pressure of 300 to 600 kgf/cm$^2$ to obtain a predetermined thickness.

(c') The metal mesh treated in the step (b') is introduced into a heating furnace, and heated at a temperature of 360 to 380° C. for a period between several minutes and ten and several minutes to sinter the resin composition. Then, the metal mesh is taken out of the furnace and rolled again to correct the size, thereby obtaining an aimed sliding member.

In the sliding member obtained through the steps (a') to (c'), the thickness of the coating layer composed of the resin composition formed on the surface of the metal mesh is usually from 0.05 to 1.0 mm. The thus obtained sliding member is cut into an appropriate size and used as a flat sliding plate or as a cylindrical winding bush by bending.

As described above, in accordance with the present invention, there is provided a sliding member capable of exhibiting excellent sliding characteristics such as stable low friction coefficient and extremely low wear amount under various different working conditions, for example, under dry frictional condition, oil-immersed condition or oil-lubricated condition.

EXAMPLES

The present invention will be described in more detail below with reference to examples. However, these examples are merely illustrative and not intended to limit the invention thereto.

In the following examples, the sliding characteristics of the sliding member (I) were evaluated by the following test methods (1) to (4), and those of the sliding member (II) were evaluated by the test method (2).

Thrust Test (1)

A friction coefficient and wear amount were measured under the conditions described in Table 1 below. Then, the friction coefficient was indicated by the value measured upon a stable condition during the period of from one hour after the start of the test up to the completion of the test. Further, the wear amount was indicated by the amount of dimensional change of the sliding surface after a test time of 8 hours.

TABLE 1

| | |
|---|---|
| Sliding speed | 20 m/min. |
| Load | 20 kgf/cm$^2$ |
| Test time | 8 hrs. |
| Lubrication | non-lubrication |
| Mating member | Carbon steel for mechanical structural use (S45C) |

Thrust Test (2)

A friction coefficient and wear amount were measured under the conditions described in Table (2) below. Then, the friction coefficient was indicated by the value measured upon a stable condition during the period of from one hour after the start of the test up to the completion of the test. Further, the wear amount was indicated by the amount of dimensional change for the sliding surface after a test time of 8 hours.

TABLE 2

| | |
|---|---|
| Sliding speed | 10 m/min. |
| Load | 100 kgf/cm$^2$ |
| Test time | 8 hrs. |
| Lubrication | non-lubrication |
| Mating member | Carbon steel for mechanical structural use (S45C) |

Reciprocating Slide Test (3)

A friction coefficient and wear amount were measured under the conditions described in Table (3) below. Then, the friction coefficient was indicated by the value measured upon a stable condition during the period of from one hour after the start of the test up to the completion of the test. Further, the wear amount was indicated by the amount of dimensional change for the sliding surface after a test time of 8 hours.

TABLE 3

| | |
|---|---|
| Sliding speed | 5 m/min. |
| Load | 50 kgf/cm$^2$ |
| Test time | 8 hrs. |
| Lubrication | Lubricating oil (ATF-DII produced by Idemitsu Kosan Co., Ltd.) |
| Mating member | Carbon steel for mechanical structural use (S45C) |

Reciprocating Slide Test (4)

A friction coefficient and wear amount were measured under the conditions described in Table (4) below. Then, the friction coefficient was indicated by the value measured upon a stable condition during the period of from one hour after the start of the test up to the completion of the test.

Further, the wear amount was indicated by the amount of dimensional change for the sliding surface after a test time of 8 hours.

TABLE 4

| | |
|---|---|
| Sliding speed | 5 m/min. |
| Load | 100 kgf/cm$^2$ |
| Test time | 8 hrs. |
| Lubrication | Lubricating oil (ATF-DII produced by Idemitsu Kosan Co., Ltd.) |
| Mating member | Carbon steel for mechanical structural use (S45C) |

Examples 1 to 20 and Comparative Examples 1 to 3

In the following examples and comparative examples, "Polyflon F201" (tradename, produced by Daikin Kogyo Co., Ltd) was used as the PTFE resin, and a mixed solvent of an aliphatic solvent and a naphthenic solvent "Exxsol" (tradename, produced by Exxon Chemical Co., Ltd) was used as the petroleum-based solvent.

First, the PTFE resin and each of the fillers shown in Tables 5 to 10 were charged into a Henschel mixer, and mixed under stirring. 20 parts by weight of the petroleum-based solvent was blended with 100 parts by weight of the resultant mixture, and mixed at a temperature (15° C.) lower than the room-temperature transition point of the PTFE resin, to obtain a resin composition.

The thus obtained resin composition was spread over a porous sintered metal (bronze) layer (thickness: 0.25 mm) formed on a thin steel backing plate (thickness: 0.70 mm), and rolled for filling the resin composition into pores of the porous sintered metal layer and coating the surface of the porous sintered metal layer therewith so as to form a resin composition layer having a thickness of 0.25 mm, thereby obtaining a multi-layered plate. The thus obtained multi-layered plate was held in a hot-air drying furnace heated to 200° C. for 5 minutes to remove the solvent. Then, the dried multi-layered plate was rolled under a pressure of 400 kgf/cm$^2$ to form a resin composition layer having a thickness of 0.10 mm on the sintered metal layer.

The multi-layered plate thus pressure-treated was then introduced into a heating furnace, and heated at 370° C. for 10 minutes to sinter the resin composition. Subsequently, the plate was rolled again to correct the size and waviness of the plate, thereby obtaining a multi-layered sliding member. After completion of the correction, the multi-layered sliding member was cut into a rectangular test piece having each side length of 30 mm.

FIG. 1 shows a cross-sectional view of the thus obtained multi-layered sliding member. In FIG. 1, reference numeral 1 denotes a steel backing plate; 2 denotes a porous sintered metal layer lined by the steel backing plate; and 3 denotes a coating layer (sliding layer) formed by filling pores of the porous sintered metal layer 2 with the resin composition and coating the surface of the sintered metal layer therewith.

The results of the thrust tests (1) and (2) for each of the obtained sliding members are shown in Tables 5 to 10.

In the tables, the amounts of respective components blended are indicated by "% by weight". Further, "Bellpearl C-2000" (tradename, produced by Kanebo Co., Ltd.) and "Ceramer" (tradename, produced by Hoechst AG.) were used as the phenol resin-calcined product and polyphenylene sulfone resin, respectively.

TABLE 5

| | | | | | | | | | Thrust test (1) | | Thrust test (2) | |
|---|---|---|---|---|---|---|---|---|---|---|---|---|
| | | Barium sulfate | | Phosphate | | Polyimide | | Solid lubricant | | Friction coefficient | Wear amount | Friction coefficient | Wear amount |
| Examples | PTFE | Kind | Amount | Kind | Amount | Kind | Amount | Kind | Amount | (× 10$^{-2}$) | (μm) | (× 10$^{-2}$) | (μm) |
| Example 1 | 73 | Baryte type | 15 | Calcium pyro-phosphate | 10 | Thermosetting | 2 | — | — | 11.5 | 5 | 7 | 14 |
| Example 2 | 72.5 | Baryte type | 15 | Calcium pyro-phosphate | 10 | Thermosetting | 2 | Graphite | 0.5 | 11 | 4 | 7 | 12 |
| Example 3 | 72.5 | Baryte type | 15 | Calcium hydrogen phosphate | 10 | Thermosetting | 2 | Graphite | 0.5 | 13 | 8 | 8.5 | 16 |
| Example 4 | 69.5 | Baryte type | 18 | Calcium pyro-phosphate | 10 | Thermosetting | 2 | Graphite | 0.5 | 12 | 5 | 7.5 | 12 |

TABLE 6

| | | | | | | | | | Thrust test (1) | | Thrust test (2) | |
|---|---|---|---|---|---|---|---|---|---|---|---|---|
| | | Barium sulfate | | Phosphate | | Polyimide | | Solid lubricant | | Friction coefficient | Wear amount | Friction coefficient | Wear amount |
| Examples | PTFE | Kind | Amount | Kind | Amount | Kind | Amount | Kind | Amount | (× 10$^{-2}$) | (μm) | (× 10$^{-2}$) | (μm) |
| Example 5 | 69 | Baryte type | 18 | Calcium hydrogen phosphate | 10 | Thermosetting | 2.5 | Graphite | 0.5 | 14 | 5 | 7.5 | 12 |

TABLE 6-continued

| | | Barium sulfate | | Phosphate | | Polyimide | | Solid lubricant | | Thrust test (1) | | Thrust test (2) | |
| | | | | | | | | | | Friction coefficient ($\times 10^{-2}$) | Wear amount ($\mu m$) | Friction coefficient ($\times 10^{-2}$) | Wear amount ($\mu m$) |
| Examples | PTFE | Kind | Amount | Kind | Amount | Kind | Amount | Kind | Amount | | | | |
| --- | --- | --- | --- | --- | --- | --- | --- | --- | --- | --- | --- | --- | --- |
| Example 6 | 69 | Precipitated type | 18 | Calcium pyrophosphate | 10 | Thermosetting | 2.5 | Molybdenum disulfide | 0.5 | 15 | 6 | 8 | 14 |
| Example 7 | 72 | Baryte type | 20 | Calcium pyrophosphate | 5 | Thermosetting | 3 | — | — | 15 | 4 | 9 | 17 |
| Example 8 | 71.5 | Baryte type | 20 | Calcium pyrophosphate | 5 | Thermosetting | 3 | Graphite | 0.5 | 13 | 4 | 8 | 13 |

TABLE 7

| | | Barium sulfate | | Phosphate | | Polyimide | | Solid lubricant | | Thrust test (1) | | Thrust test (2) | |
| | | | | | | | | | | Friction coefficient ($\times 10^{-2}$) | Wear amount ($\mu m$) | Friction coefficient ($\times 10^{-2}$) | Wear amount ($\mu m$) |
| Examples | PTFE | Kind | Amount | Kind | Amount | Kind | Amount | Kind | Amount | | | | |
| --- | --- | --- | --- | --- | --- | --- | --- | --- | --- | --- | --- | --- | --- |
| Example 9 | 68 | Baryte type | 20 | Calcium pyrophosphate | 10 | Thermosetting | 2 | — | — | 14 | 3 | 7.5 | 13 |
| Example 10 | 67.5 | Baryte type | 20 | Calcium pyrophosphate | 10 | Aromatic | 2 | Graphite | 0.5 | 12 | 5 | 7.5 | 13 |
| Example 11 | 67.5 | Baryte type | 20 | Calcium hydrogen phosphate | 10 | Aromatic | 2 | Molybdenum disulfide | 0.5 | 13 | 6 | 8 | 15 |
| Example 12 | 65 | Baryte type | 20 | Calcium pyrophosphate | 10 | Thermosetting | 4 | Graphite | 1 | 14 | 4 | 7.5 | 10 |

TABLE 8

| | | Barium sulfate | | Phosphate | | Polyimide | | Solid lubricant | | Thrust test (1) | | Thrust test (2) | |
| | | | | | | | | | | Friction coefficient ($\times 10^{-2}$) | Wear amount ($\mu m$) | Friction coefficient ($\times 10^{-2}$) | Wear amount ($\mu m$) |
| Examples | PTFE | Kind | Amount | Kind | Amount | Kind | Amount | Kind | Amount | | | | |
| --- | --- | --- | --- | --- | --- | --- | --- | --- | --- | --- | --- | --- | --- |
| Example 13 | 67 | Baryte type | 25 | Calcium pyrophosphate | 5 | Thermosetting | 3 | — | — | 14 | 3 | 8.5 | 16 |
| Example 14 | 66 | Baryte type | 25 | Calcium pyrophosphate | 5 | Thermosetting | 3 | Graphite | 1 | 16 | 6 | 8 | 14 |
| Example 15 | 62 | Baryte type | 25 | Calcium pyrophosphate | 10 | Thermosetting | 3 | — | — | 15 | 2 | 9 | 9 |

TABLE 9

| | | Barium sulfate | | Phosphate | | Polyimide | | Phenol resin-calcined product | Polyphenylene sulfone resin | Solid lubricant | | Thrust test (1) | | Thrust test (2) | |
| | | | | | | | | | | | | Friction coefficient ($\times 10^{-2}$) | Wear amount ($\mu m$) | Friction coefficient ($\times 10^{-2}$) | Wear amount ($\mu m$) |
| Examples | PTFE | Kind | Amount | Kind | Amount | Kind | Amount | | | Kind | Amount | | | | |
| --- | --- | --- | --- | --- | --- | --- | --- | --- | --- | --- | --- | --- | --- | --- | --- |
| Example 16 | 70 | Baryte type | 15 | Calcium pyrophosphate | 10 | — | — | 5 | — | — | — | 12 | 3 | 7 | 17 |

TABLE 9-continued

| Examples | PTFE | Barium sulfate Kind | Amount | Phosphate Kind | Amount | Polyimide Kind | Amount | Phenol resin-calcined product | Polyphenylene sulfone resin | Solid lubricant Kind | Amount | Thrust test (1) Friction coefficient (× 10⁻²) | Wear amount (μm) | Thrust test (2) Friction coefficient (× 10⁻²) | Wear amount (μm) |
|---|---|---|---|---|---|---|---|---|---|---|---|---|---|---|---|
| Example 17 | 69 | Baryte type | 15 | Calcium pyrophosphate | 10 | — | — | 5 | — | Graphite | 1 | 12 | 3 | 7 | 16 |
| Example 18 | 68 | Baryte type | 18 | Calcium pyrophosphate | 10 | — | — | — | 4 | — | — | 13 | 4 | 8 | 13 |
| Example 19 | 67.5 | Baryte type | 18 | Calcium pyrophosphate | 10 | — | — | — | 4 | Graphite | 0.5 | 12 | 3 | 7 | 12 |
| Example 20 | 70.5 | Baryte type | 15 | Calcium pyrophosphate | 10 | Thermosetting | 2 | — | 2 | Graphite | 0.5 | 13 | 4 | 9 | 13 |

TABLE 10

| Comparative Examples | PTFE | Barium sulfate Kind | Amount | Phosphate Kind | Amount | Polyimide Kind | Amount | Lead | Thrust test (1) Friction coefficient (× 10⁻²) | Wear amount (μm) | Thrust test (2) Friction coefficient (× 10⁻²) | Wear amount (μm) |
|---|---|---|---|---|---|---|---|---|---|---|---|---|
| Comparative Example 1 | 50 | — | — | — | — | — | — | 50 | 14 | 31 | * | * |
| Comparative Example 2 | 70 | — | — | Calcium pyrophosphate | 10 | — | — | 20 | 16 | 8 | 11 | 85 |
| Comparative Example 3 | 80 | — | — | — | — | Aromatic | 20 | — | 19 | 12 | 10 | 20 |

(Note)
*: The friction coefficient of the test piece was abruptly increased two hours after starting the test and, therefore, the test was discontinued.

From the above test results, it was confirmed that the multi-layered sliding members obtained in Examples exhibited a stable performance, a small wear amount and, therefore, excellent sliding characteristics through the test period. On the other hand, the multi-layered sliding members obtained in Comparative Examples, especially Comparative Examples 2 and 3, exhibited friction coefficients which are not so different from those of the multi-layered sliding members obtained in Examples, but were large in wear amount and, therefore, deteriorated in sliding characteristics.

Then, the multi-layered plates obtained in Examples 1–2, 4, 7–10, 12–14 and 16–20, and Comparative Examples 2 and 3 were cut into small plates, and each small plate was bent into a semi-cylindrical shape while facing the coating layer inward, thereby obtaining a multi-layered sliding member having a radius of 20.0 mm, a length of 20.0 mm and a thickness of 1.05 mm as a test piece.

The results of the reciprocating slide tests (3) and (4) of the respective multi-layered sliding members are shown in Tables 11 to 14.

TABLE 11

| Examples | Reciprocating test (3) Friction coefficient (× 10⁻³) | Wear amount (μm) | Reciprocating test (4) Friction coefficient (× 10⁻³) | Wear amount (μm) |
|---|---|---|---|---|
| Example 1 | 26 | 6 | 36 | 8 |
| Example 2 | 24 | 5 | 35 | 5 |
| Example 4 | 20 | 2 | 26 | 4 |
| Example 7 | 26 | 4 | 30 | 6 |
| Example 8 | 25 | 3 | 28 | 5 |

TABLE 12

| Examples | Reciprocating test (3) Friction coefficient (× 10⁻³) | Wear amount (μm) | Reciprocating test (4) Friction coefficient (× 10⁻³) | Wear amount (μm) |
|---|---|---|---|---|
| Example 9 | 21 | 2 | 29 | 4 |
| Example 10 | 23 | 3 | 28 | 4 |
| Example 12 | 25 | 5 | 30 | 6 |

TABLE 12-continued

|  | Reciprocating test (3) | | Reciprocating test (4) | |
| --- | --- | --- | --- | --- |
| Examples | Friction coefficient (× 10⁻³) | Wear amount (μm) | Friction coefficient (× 10⁻³) | Wear amount (μm) |
| Example 13 | 28 | 5 | 33 | 6 |
| Example 14 | 26 | 4 | 30 | 5 |

TABLE 13

|  | Reciprocating test (3) | | Reciprocating test (4) | |
| --- | --- | --- | --- | --- |
| Examples | Friction coefficient (× 10⁻³) | Wear amount (μm) | Friction coefficient (× 10⁻³) | Wear amount (μm) |
| Example 16 | 31 | 4 | 35 | 6 |
| Example 17 | 29 | 4 | 38 | 6 |
| Example 18 | 27 | 3 | 30 | 5 |
| Example 19 | 28 | 4 | 33 | 3 |
| Example 20 | 27 | 3 | 32 | 5 |

TABLE 14

|  | Reciprocating test (3) | | Reciprocating test (4) | |
| --- | --- | --- | --- | --- |
| Examples | Friction coefficient (× 10⁻³) | Wear amount (μm) | Friction coefficient (× 10⁻³) | Wear amount (μm) |
| Comparative Example 2 | 100 | 48 | * | * |
| Comparative Example 3 | 28 | 7 | 51 | 18 |

(Note)
*: The friction coefficient of the test piece was abruptly increased 30 minutes after starting the test and, therefore, the test was discontinued.

From the above test results, it was confirmed that the multi-layered sliding members obtained in Examples stably exhibited an extremely low friction coefficients as well as a small wear amount throughout the test period.

Examples 21 to 33 and Comparative Examples 4 to 6

In the following examples and comparative examples, "Polyflon F201" (tradename, produced by Daikin Kogyo Co., Ltd) was used as the PTFE resin, and a mixed solvent of an aliphatic solvent and a naphthenic solvent "Exxsol" (tradename, produced by Exxon Chemical Co., Ltd) was used as the petroleum-based solvent.

First, the PTFE resin and the fillers shown in Tables 15 to 18 were charged into a Henschel mixer, and mixed under stirring 20 parts by weight of the petroleum-based solvent was blended with 100 parts by weight of the resultant mixture, and mixed at a temperature (15° C.) lower than the room-temperature transition point of the PTFE resin, to obtain a resin composition.

A phosphor bronze plate having a thickness of 0.3 mm was processed into an expanded metal provided with regularly arranged rectangular meshes each having a side (strand) length of 0.6 mm, and a thickness of 0.43 mm, thereby obtaining a substrate A. Also, fine metal wires made of phosphor bronze as warp and weft having a diameter of 0.3 mm were woven into a wire mesh with 50 meshes, thereby obtaining a substrate B.

The resin composition was applied over the substrate A made of the expanded metal and the substrate B made of the woven wire mesh, and rolled to fill the meshes of the metal mesh with the resin composition and cover the surface of the metal mesh therewith to form a coating layer composed of the resin composition thereon. The substrate obtained by filling the meshes and coating the surface with the resin composition was then held in a hot-air drying furnace heated to 220° C. for 5 minutes to remove the solvent from the resin composition.

Then, thus dried substrates which had been obtained by filling the meshes and coating the surface with the resin composition was introduced into a heating furnace, and heated at 360° C. for ten minutes to sinter the resin composition, and then rolled under pressure to correct the size, waviness and the like, thereby obtaining the substrate having a resin composition layer with a thickness of 0.13 mm on the surface thereof. After completion of the correction, the obtained sliding member material was cut into a rectangular sliding member having a size of 30×30 mm as a test piece.

Figure 2:
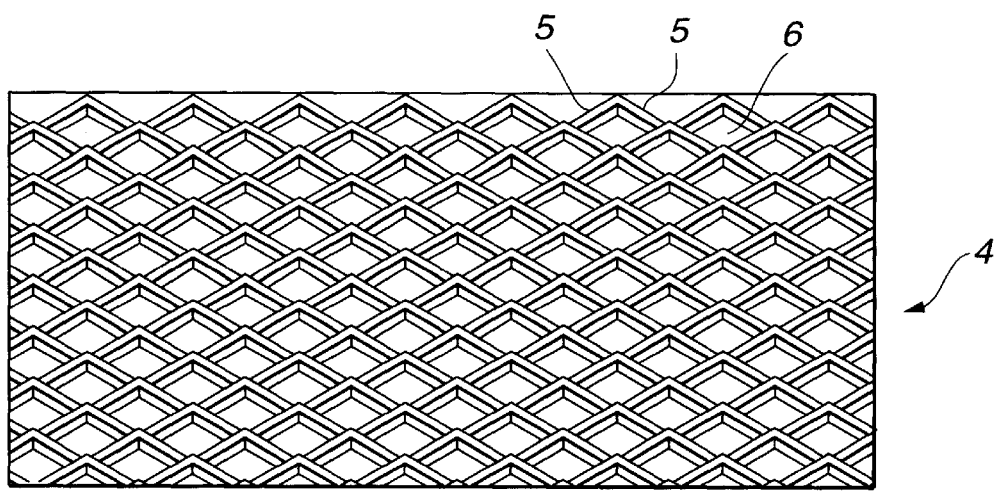
FIG. 2 is a plan view of an expanded metal as a substrate.
Figure 3:
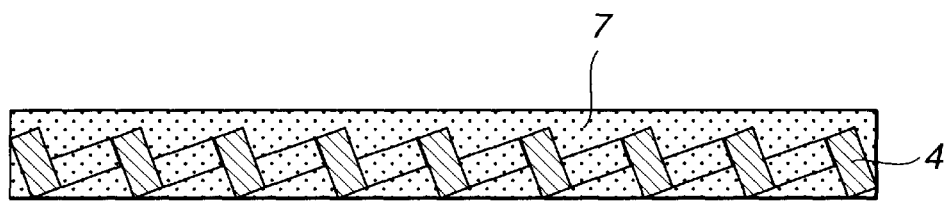
FIG. 3 is a cross-sectional view illustrating an example of a sliding member according to the present invention, wherein the expanded metal as shown in FIG. 2 is used as a substrate.

FIG. 2 shows a plan view of the expanded metal, and FIG. 3 shows a cross-sectional view of the sliding member using the expanded metal shown in FIG. 2 as substrate. In FIGS. 2 and 3, reference numeral 4 denotes the expanded metal; 5 denotes each side (strand); 6 denotes the mesh; and 7 denotes the coating layer (sliding layer) made of the resin composition which was filled in each mesh of the expanded metal and coated (covered) on the surface thereof.

Figure 4:
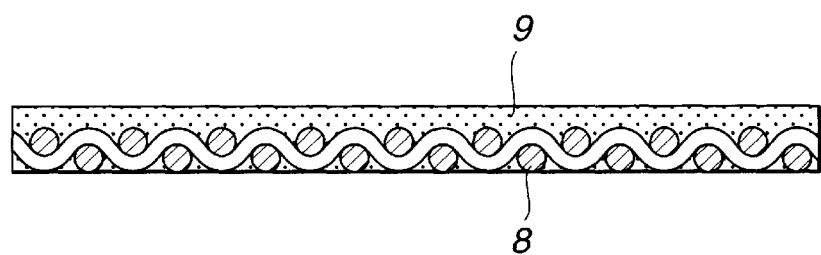
FIG. 4 is a cross-sectional view illustrating an example of a sliding member according to the present invention, wherein a woven wire mesh is used as a substrate.

In addition, FIG. 4 shows a cross-sectional view of the sliding member using the woven wire mesh as substrate. In FIG. 4, reference numeral 8 denotes the woven wire mesh; and 9 denotes the coating layer (sliding layer) made of the resin composition which was filled in each mesh of the woven wire mesh and coated (covered) on the surface thereof.

The results of the thrust test (2) for each sliding member are shown in Tables 15 to 18.

In the Tables, the amounts of respective components blended are expressed by "% by weight". Further, "Bellpearl C-2000" (tradename, produced by Kanebo Co., Ltd.) and "Ceramer" (tradename, produced by Hoechst AG.) were used as the phenol resin-calcined product and polyphenylene sulfone resin, respectively.

TABLE 15

| Examples | PTFE | Barium sulfate Kind | Amount | Phosphate Kind | Amount | Polyimide Kind | Amount | Solid lubricant Kind | Amount | Substrate Kind | Thrust test (2) Friction coefficient (× 10⁻²) | Wear amount (μm) |
|---|---|---|---|---|---|---|---|---|---|---|---|---|
| Example 21 | 73 | Baryte type | 15 | Calcium pyrophosphate | 10 | Thermosetting | 2 | — | — | A | 7 | 12 |
| Example 22 | 73 | Baryte type | 15 | Calcium pyrophosphate | 10 | Thermosetting | 2 | — | — | B | 7 | 13 |
| Example 23 | 69.5 | Baryte type | 18 | Calcium pyrophosphate | 10 | Thermosetting | 2 | Graphite | 0.5 | A | 7 | 11 |
| Example 24 | 69.5 | Baryte type | 18 | Calcium pyrophosphate | 10 | Thermosetting | 2 | Graphite | 0.5 | B | 8 | 12 |

TABLE 16

| Examples | PTFE | Barium sulfate Kind | Amount | Phosphate Kind | Amount | Polyimide Kind | Amount | Solid lubricant Kind | Amount | Substrate Kind | Thrust test (2) Friction coefficient (× 10⁻²) | Wear amount (μm) |
|---|---|---|---|---|---|---|---|---|---|---|---|---|
| Example 25 | 68 | Baryte type | 20 | Calcium pyrophosphate | 10 | Thermosetting | 2 | — | — | A | 8 | 13 |
| Example 26 | 67.5 | Baryte type | 20 | Calcium pyrophosphate | 10 | Thermosetting | 2 | Graphite | 0.5 | A | 8 | 11 |
| Example 27 | 66 | Baryte type | 20 | Calcium pyrophosphate | 10 | Thermosetting | 4 | — | — | A | 9 | 10 |
| Example 28 | 62 | Baryte type | 25 | Calcium pyrophosphate | 10 | Thermosetting | 3 | — | — | B | 8 | 11 |

TABLE 17

| Examples | PTFE | Barium sulfate Kind | Amount | Phosphate Kind | Amount | Polyimide Kind | Amount | Phenol resin-calcined product | Polyphenylene sulfone resin | Solid lubricant Kind | Amount | Substrate Kind | Thrust test (2) Friction coefficient (× 10⁻²) | Wear amount (μm) |
|---|---|---|---|---|---|---|---|---|---|---|---|---|---|---|
| Example 29 | 70 | Baryte type | 15 | Calcium pyrophosphate | 10 | — | — | 5 | — | — | — | A | 7 | 15 |
| Example 30 | 69 | Baryte type | 15 | Calcium pyrophosphate | 10 | — | — | 5 | — | Graphite | 1 | B | 7 | 14 |
| Example 31 | 68 | Baryte type | 18 | Calcium pyrophosphate | 10 | — | — | — | 4 | — | — | B | 8 | 13 |
| Example 32 | 67.5 | Baryte type | 18 | Calcium pyrophosphate | 10 | — | — | — | 4 | Graphite | 0.5 | A | 7 | 13 |
| Example 33 | 70.5 | Baryte type | 15 | Calcium pyrophosphate | 10 | Thermosetting | 2 | — | 2 | Graphite | 0.5 | A | 9 | 13 |

TABLE 18

| Comparative Examples | PTFE | Barium sulfate Kind | Amount | Phosphate Kind | Amount | Polyimide Kind | Amount | Lead | Substrate Kind | Thrust test (2) Friction coefficient (× 10⁻²) | Wear amount (μm) |
|---|---|---|---|---|---|---|---|---|---|---|---|
| Comparative Example 4 | 70 | — | — | Calcium pyrophosphate | 10 | — | — | 20 | A | 12 | 90 |
| Comparative | 70 | — | — | Calcium pyro- | 10 | — | — | 20 | B | 13 | 96 |

TABLE 18-continued

| Comparative Examples | PTFE | Barium sulfate Kind | Amount | Phosphate Kind | Amount | Polyimide Kind | Amount | Lead | Substrate Kind | Thrust test (2) Friction coefficient (× 10⁻²) | Wear amount (μm) |
|---|---|---|---|---|---|---|---|---|---|---|---|
| Example 5 Comparative Example 6 | 80 | — | — | phosphate | — | Thermosetting | 20 | — | A | 11 | 25 |

From the above test results, it was confirmed that the sliding members obtained in Examples exhibited a low friction coefficients, a stable performance through the test period, and an extremely small wear amount of not more than 15 μm, and were, therefore, excellent in sliding characteristics. On the other hand, the sliding members obtained in Comparative Examples exhibited high friction coefficients and a large wear amount and were, therefore, deteriorated in sliding characteristics.

What is claimed is:

1. A sliding member comprising:
   a substrate comprising either a steel backing plate with a porous sintered metal layer formed on said steel backing plate, or a metal mesh; and
   a resin composition layer formed in pores or meshes of the metal mesh and on the surface thereof, comprising 5 to 40% by weight of barium sulfate, 1 to 30% by weight of a phosphate, 1 to 10% by weight of at least one member selected from the group consisting of a polyimide resin, a phenol resin-calcined product and a polyphenylene sulfone resin, and the balance of a polytetrafluoroethylene resin.

2. A sliding member according to claim 1, wherein said polyimide resin is an aromatic polyimide resin or a thermosetting polyimide resin.

3. A sliding member according to claim 1, wherein said phosphate is a metal salt of diphosphoric acid, triphosphoric acid or pyrophosphoric acid.

4. A sliding member according to claim 1, wherein said phosphate is selected from the group consisting of trilithium phosphate, lithium hydrogen phosphate, lithium pyrophosphate, tricalcium phosphate, calcium hydrogen phosphate and calcium pyrophosphate.

5. A sliding member according to claim 1, wherein said resin composition further contains graphite or molybdenum disulfide in an amount of not more than 5% by weight.

* * * * *